US012067944B2

(12) United States Patent
Hong

(10) Patent No.: US 12,067,944 B2
(45) Date of Patent: Aug. 20, 2024

(54) DISPLAY DEVICE AND OPERATING METHOD THEREOF

(71) Applicant: LG ELECTRONICS INC., Seoul (KR)

(72) Inventor: Beduero Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/112,117

(22) Filed: Feb. 21, 2023

(65) Prior Publication Data

US 2023/0317014 A1 Oct. 5, 2023

(30) Foreign Application Priority Data

Mar. 15, 2022 (KR) ........................ 10-2022-0032018
Sep. 6, 2022 (KR) ........................ 10-2022-0112945

(51) Int. Cl.
*G09G 3/3258* (2016.01)

(52) U.S. Cl.
CPC ... *G09G 3/3258* (2013.01); *G09G 2320/0626* (2013.01); *G09G 2320/0646* (2013.01); *G09G 2320/066* (2013.01); *G09G 2360/16* (2013.01)

(58) Field of Classification Search
CPC ......... G09G 3/3258; G09G 2320/0626; G09G 2320/0646; G09G 2320/066; G09G 2360/16
USPC .......................................................... 345/690
See application file for complete search history.

(56) References Cited

U.S. PATENT DOCUMENTS

| | | | | |
|---|---|---|---|---|
| 9,396,684 | B2 * | 7/2016 | Bi | G09G 3/3275 |
| 9,607,552 | B2 * | 3/2017 | Lim | G09G 3/3291 |
| 2014/0320546 | A1 * | 10/2014 | Lim | G09G 3/3291 345/77 |
| 2016/0314760 | A1 * | 10/2016 | Jangda | G09G 3/3208 |
| 2017/0124959 | A1 * | 5/2017 | Kim | G09G 3/3225 |
| 2019/0103056 | A1 * | 4/2019 | Xu | G09G 3/3258 |
| 2020/0082761 | A1 * | 3/2020 | Kim | G09G 3/3233 |
| 2021/0193047 | A1 * | 6/2021 | Kwon | G09G 3/3258 |
| 2022/0084463 | A1 * | 3/2022 | Pyo | G09G 3/3208 |
| 2023/0154396 | A1 * | 5/2023 | Zhang | G09G 3/3208 345/690 |

(Continued)

FOREIGN PATENT DOCUMENTS

KR 10-2016-0035192 3/2016

OTHER PUBLICATIONS

Korean Intellectual Property Office Application No. 10-2022-0112945, Office Action dated Apr. 12, 2024, 7 pages.

*Primary Examiner* — Tom V Sheng
(74) *Attorney, Agent, or Firm* — LEE, HONG, DEGERMAN, KANG & WAIMEY

(57) ABSTRACT

In order to prevent a rapid decrease in luminance of a screen as an average picture level (APL) increases, a display device for controlling luminance of an image through a peak luminance control (PLC) curve may comprise a display unit and a controller configured to obtain a first average picture level (APL) of a first image, to determine whether a second APL of a second image is increased compared to the first APL as the first image is switched to the second image, and to control image quality of the second image to reduce an output level of the second image when the second APL is increased compared to the first APL.

15 Claims, 16 Drawing Sheets

(56) References Cited

U.S. PATENT DOCUMENTS

2023/0169930 A1* 6/2023 Pytlarz .................... G09G 5/02
345/690

* cited by examiner

DISPLAY DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application Nos. 10-2022-0032018, filed on Mar. 15, 2022 and 10-2022-0112945, filed on Sep. 6, 2022, the contents of which are all hereby incorporated by reference herein in their entirety.

BACKGROUND OF THE INVENTION

1. Field of the Invention

The present disclosure relates to a display device, and more particularly, to an organic light emitting diode display device.

2. Discussion of the Related Art

Recently, types of display devices have been diversified. Among them, an organic light emitting diode display device (hereinafter referred to as an "OLED display device") is widely used.

An OLED display device is a display device using an organic light emitting element. Since the organic light emitting device is a self-light-emitting device, the OLED display device has advantages of having lower power consumption and manufactured to be thinner than a liquid crystal display device requiring a backlight. In addition, the OLED display device has a wide viewing angle and a fast response speed.

An OLED display device is designed to use a Peak Luminance Control (PLC) curve to lower the luminance of an image with a high Average Picture Level (APL) and to increase the luminance of an image with a low APL, for reliability.

However, due to this, in applications such as web browsers that consist of images with large changes in APL, when switching from an image with a low APL to an image with a high APL, a screen rapidly darkens, which is visually unsatisfactory.

That is, when switching from an image with a low APL to an image with a high APL, the luminance is lowered by the PLC curve and the screen rapidly darkens, which may cause inconvenience to a user in viewing the image.

SUMMARY OF THE INVENTION

An object of the present disclosure is to prevent a rapid decrease in luminance of a screen as an APL increases.

An object of the present disclosure is to reduce a change in luminance by a PLC curve when switching from an image with a low APL to an image with a high APL.

A display device for controlling luminance of an image through a peak luminance control (PLC) curve according to an embodiment of the present disclosure may comprise a display unit and a controller configured to obtain a first average picture level (APL) of a first image, to determine whether a second APL of a second image is increased compared to the first APL as the first image is switched to the second image, and to control image quality of the second image to reduce an output level of the second image when the second APL is increased compared to the first APL.

A method of operating a display device for controlling luminance of an image through a peak luminance control (PLC) curve according to an embodiment of the present disclosure may comprise obtaining a first average picture level (APL) of a first image, determining whether a second APL of a second image is increased compared to the first APL as the first image is switched to the second image, and controlling image quality of the second image to reduce an output level of the second image when the second APL is increased compared to the first APL.

According to an embodiment of the present disclosure, when an image with a low APL is switched to an image with a high APL, even if the PLC curve is used, an image in which a change in luminance is alleviated by adjusting the APL value may be output.

Accordingly, it is difficult for a user to recognize a change in brightness of the screen with the naked eye, so that the user may not feel inconvenience in viewing the image.

DETAILED DESCRIPTION OF THE PREFERRED EMBODIMENTS

Hereinafter, the present disclosure will be described in more detail with reference to the drawings.

Figure 1:
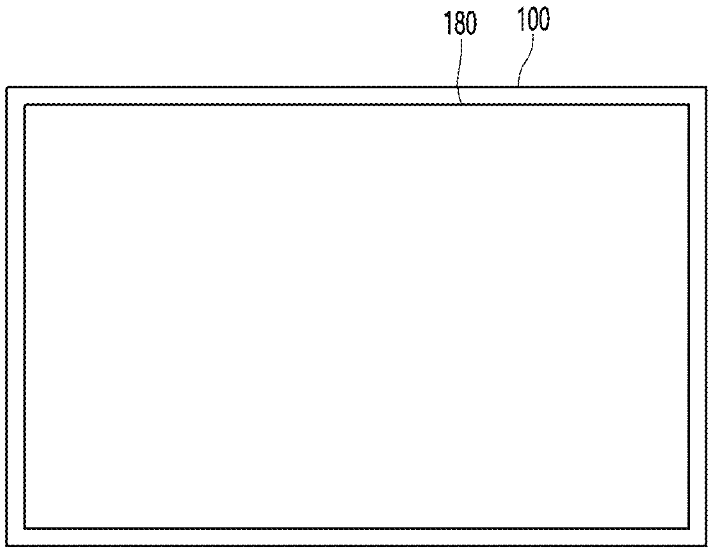
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit

180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
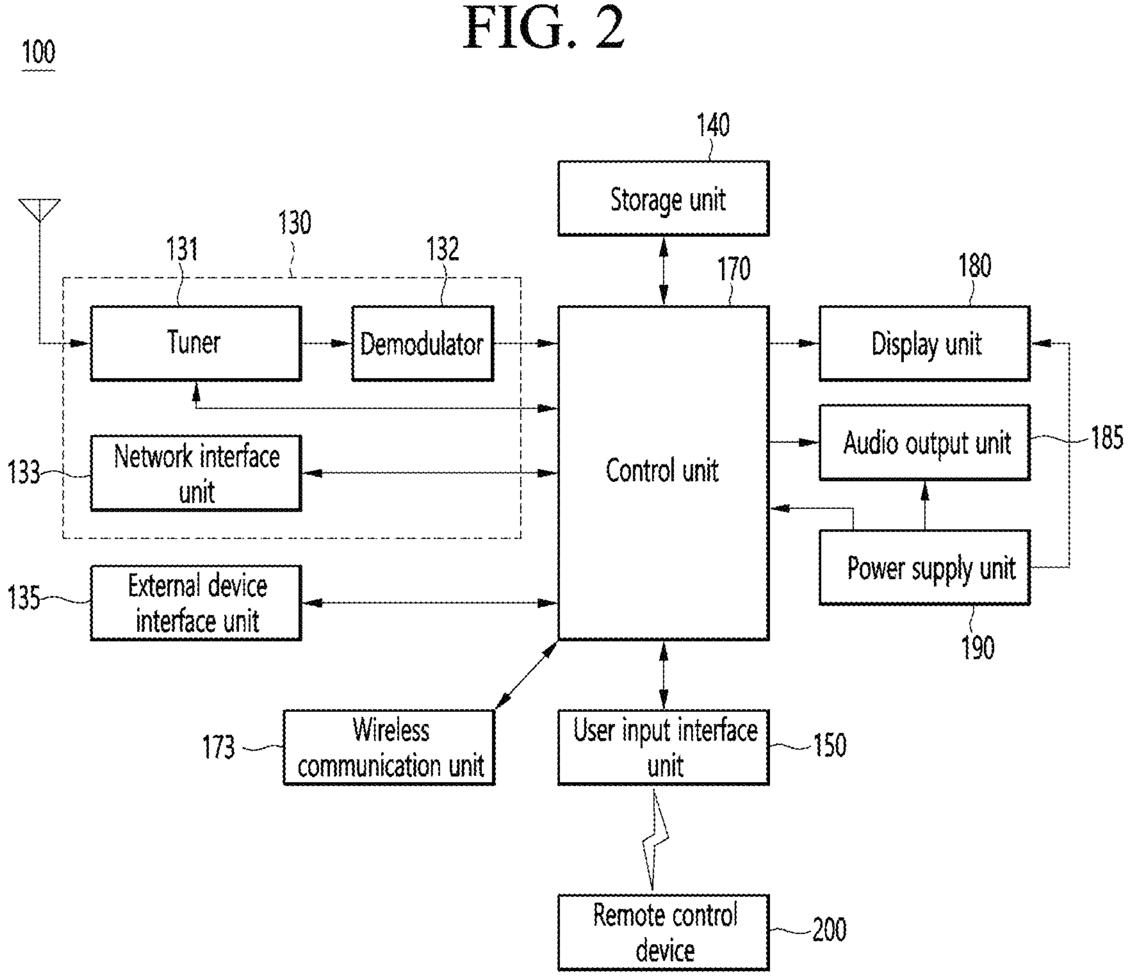
FIG. 2 is a block diagram illustrating a configuration of the display device of FIG. 1.

FIG. 2 is a block diagram showing a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R. G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content play back device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
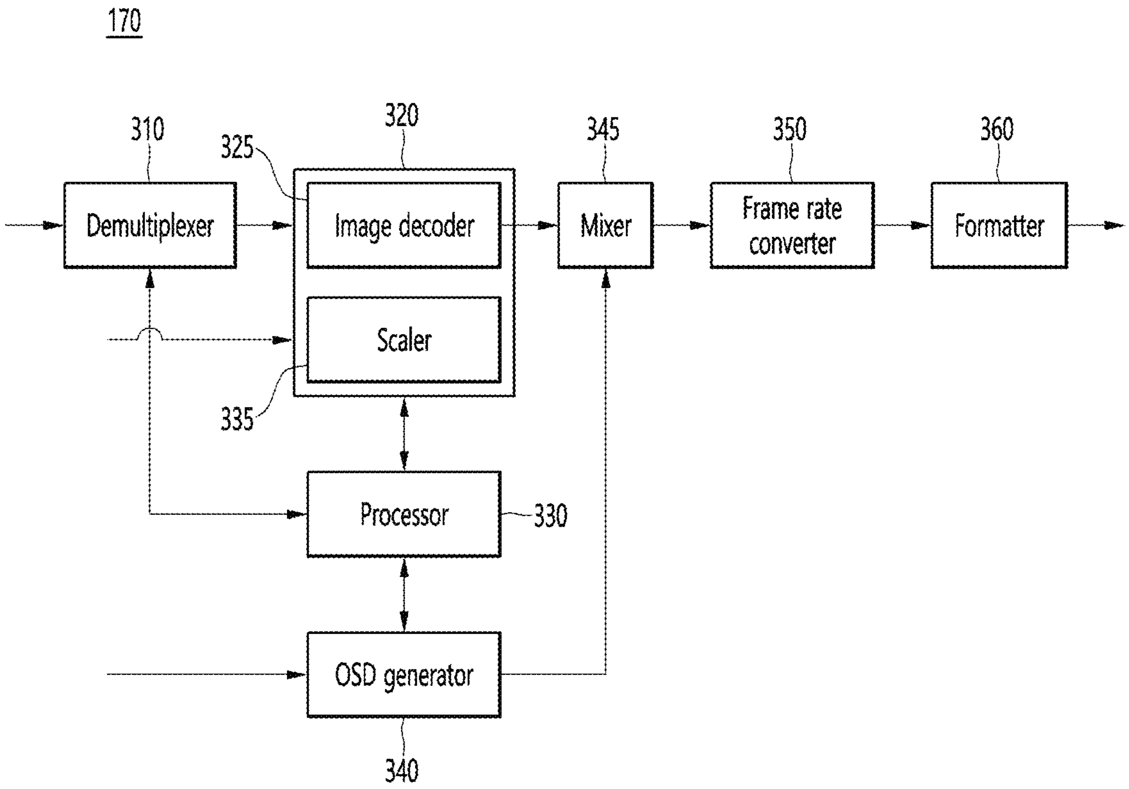
FIG. 3 is an example of an internal block diagram of a control unit of FIG. 2.

FIG. 3 is an example of an internal block diagram of the controller of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The video decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 135 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
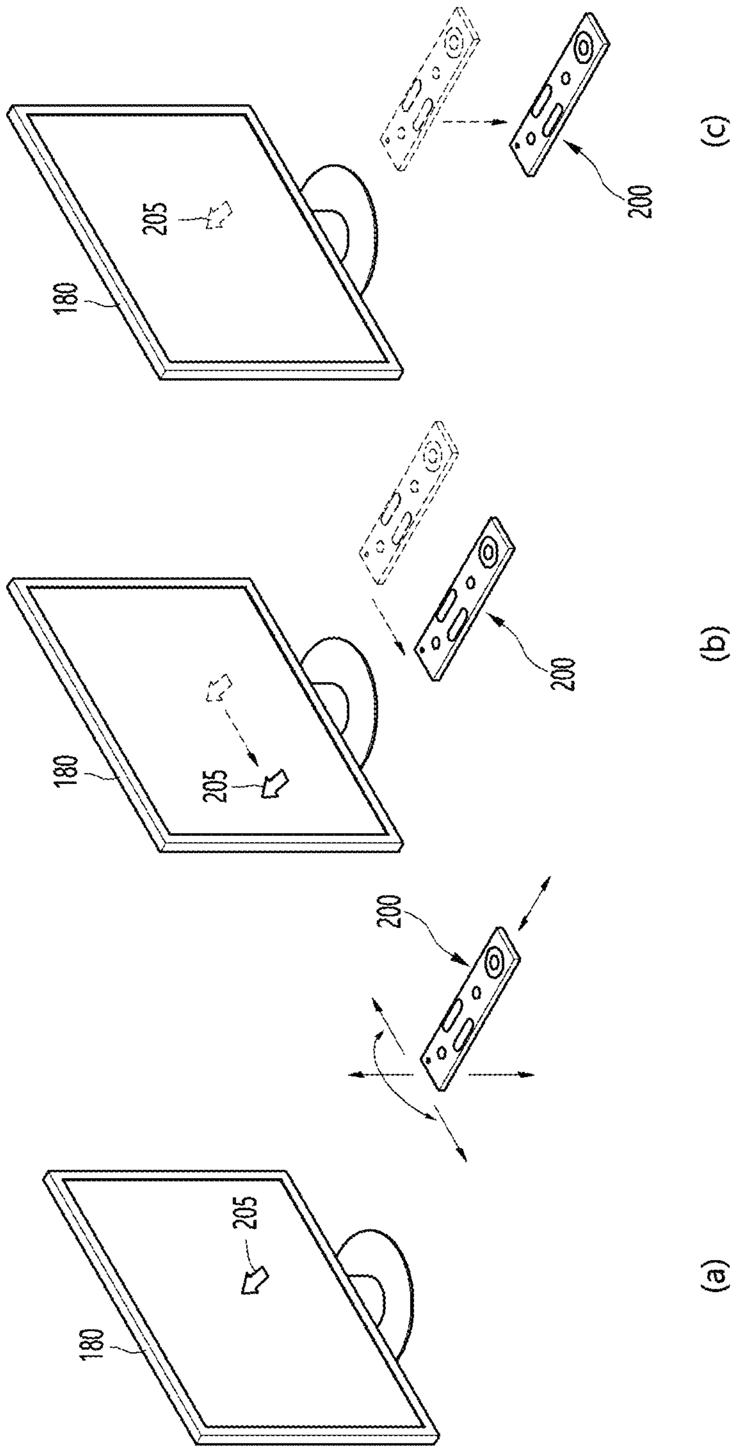
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
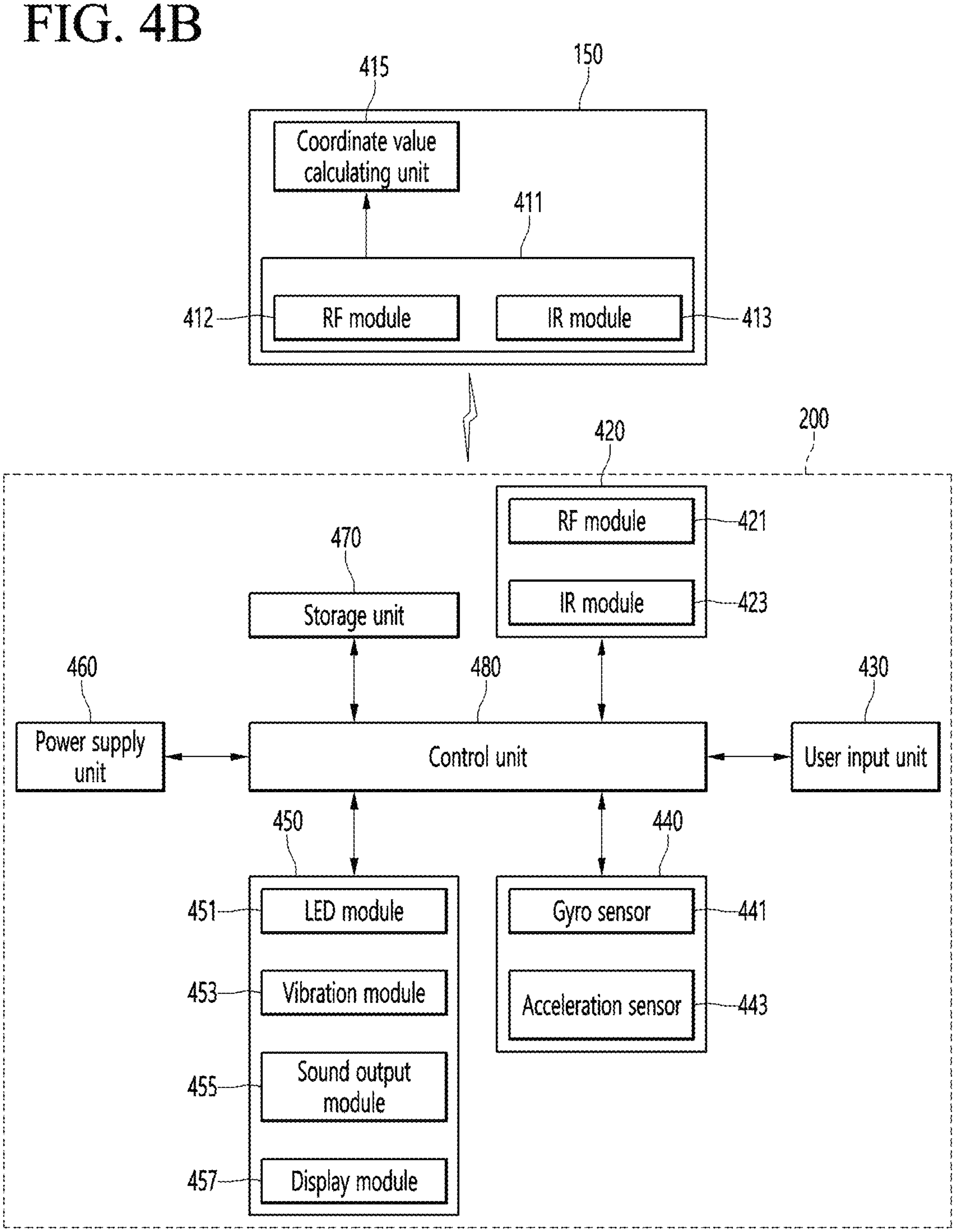
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
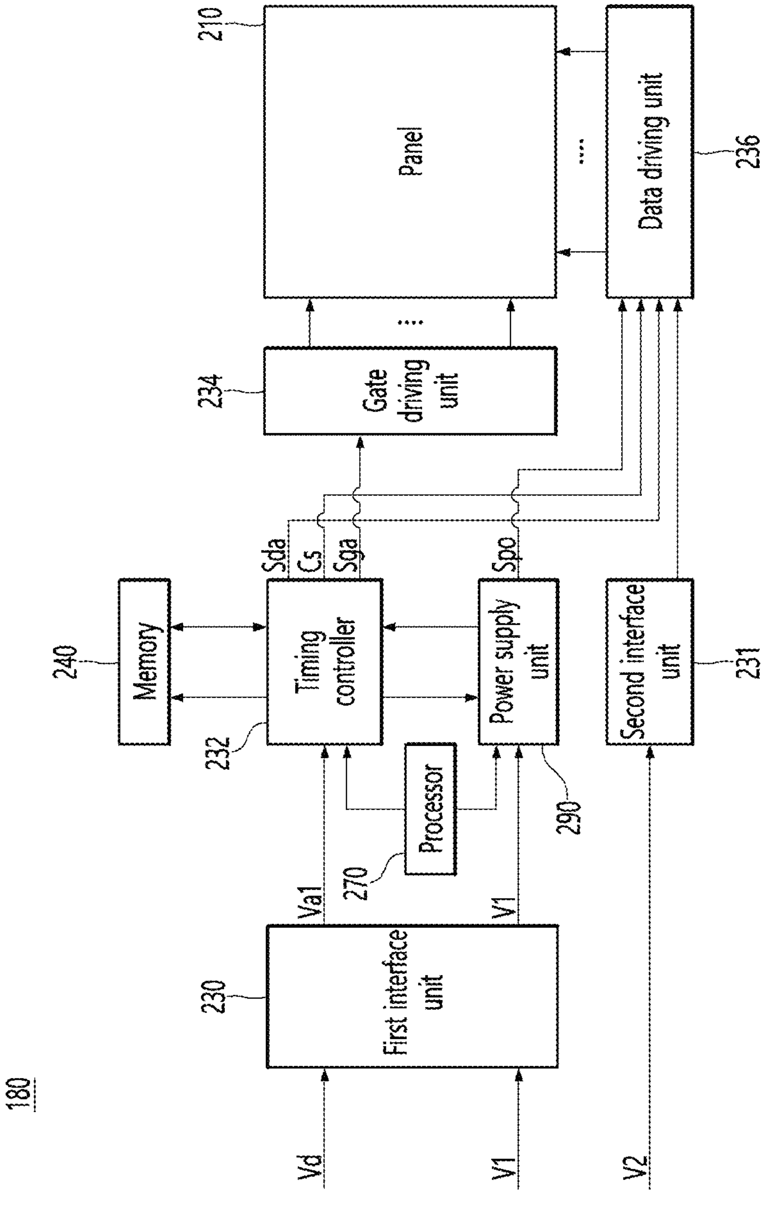
FIG. 5 is an internal block diagram of a display unit of FIG. 2.

FIG. 5 is an internal block diagram of the display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal val, the timing controller 232 may output the data driving signal Sda and the gate driving signal Sga based on the converted video signal val.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6A:
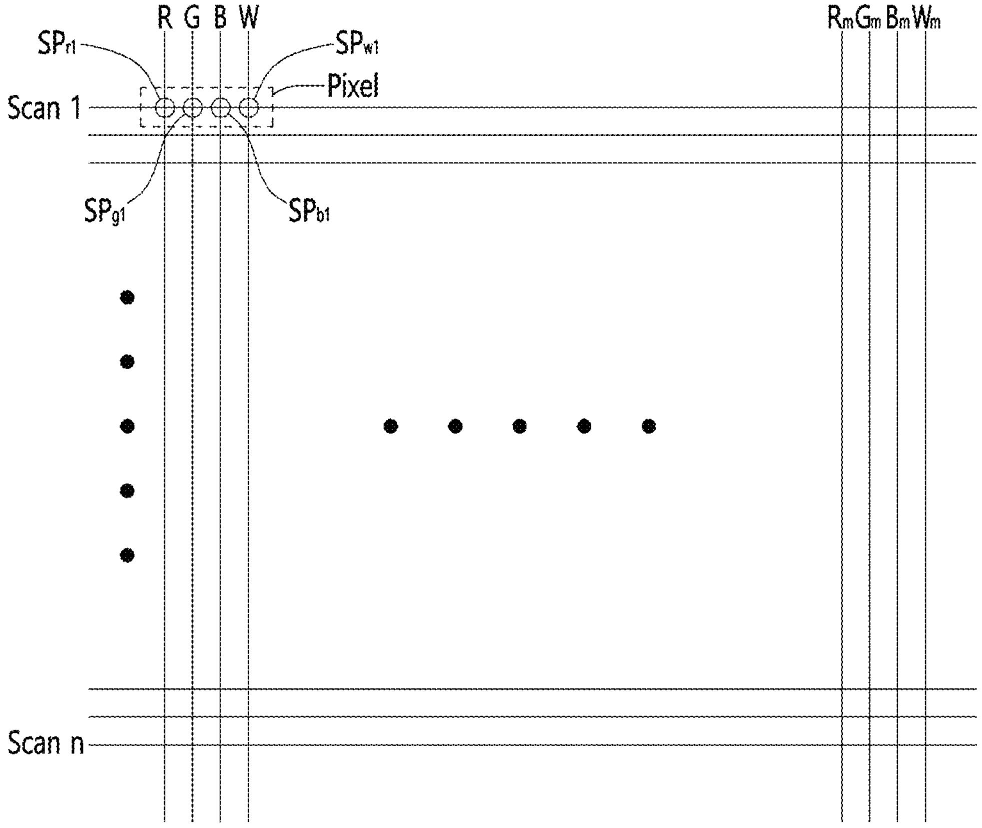
FIGS. 6A to 6B are views referred to for description of an organic light emitting panel of FIG. 5.
Figure 6B:
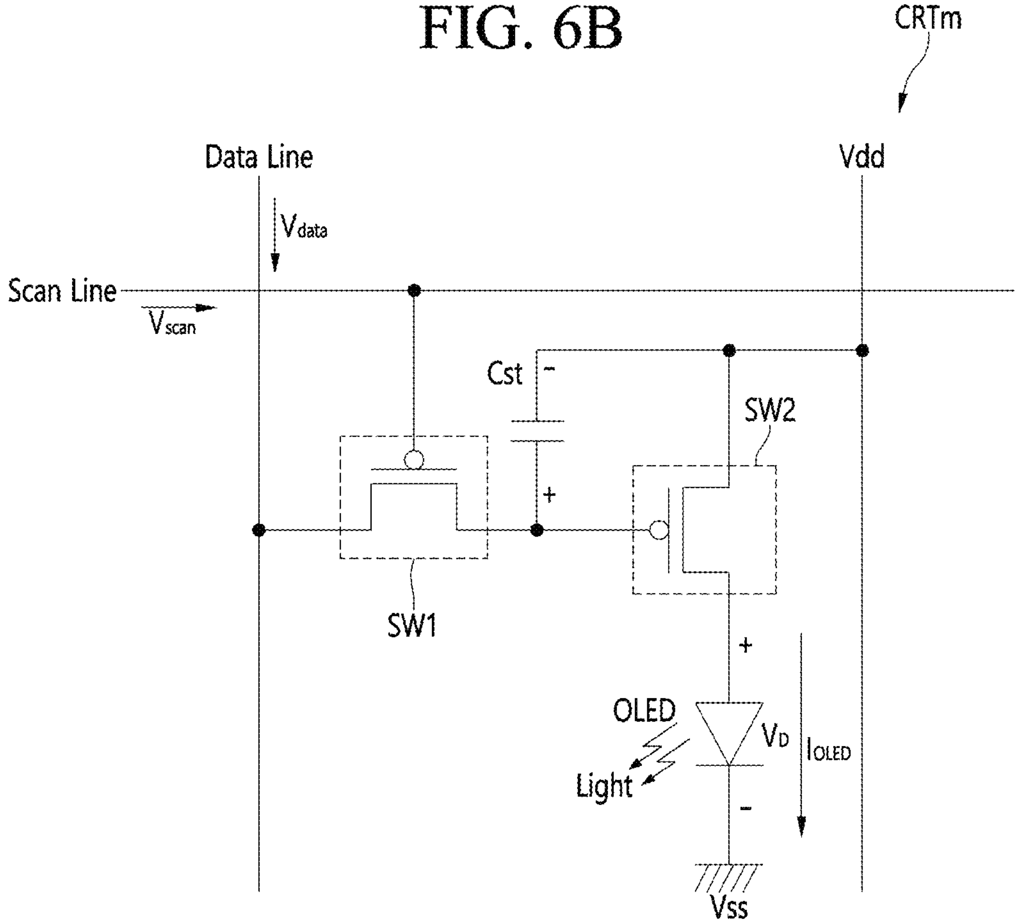

FIGS. 6A to 6B are views referred to for description of the organic light emitting panel of FIG. 5.

First, FIG. 6A is a diagram showing a pixel in the panel 210. The panel 210 may be an organic light emitting panel.

Referring to the drawing, the panel 210 may include a plurality of scan lines (Scan 1 to Scan n) and a plurality of data lines (R1, G1, B1, W1 to Rm, Gm, Bm and Wm) intersecting the scan lines.

Meanwhile, a pixel is defined at an intersection region of the scan lines and the data lines in the panel 210. In the drawing, a pixel having RGBW sub-pixels SPr1, SPg1, SPb1, and SPw1 is shown.

In FIG. 6A, although it is illustrated that the RGBW sub-pixels are provided in one pixel, RGB subpixels may be provided in one pixel. That is, it is not limited to the element arrangement method of a pixel.

FIG. 6B illustrates a circuit of a sub pixel in a pixel of the organic light emitting panel of FIG. 6A.

Referring to the drawing, an organic light emitting subpixel circuit CRTm may include a scan switching element SW1, a storage capacitor Cst, a driving switching element SW2, and an organic light emitting layer OLED, as active elements.

The scan switching element SW1 may be connected to a scan line at a gate terminal and may be turned on according to a scan signal Vscan, which is input. When the scan switching element SW1 is turned on, the input data signal Vdata may be transferred to the gate terminal of the driving switching element SW2 or one terminal of the storage capacitor Cst.

The storage capacitor Cst may be formed between the gate terminal and the source terminal of the driving switching element SW2, and store a predetermined difference between the level of a data signal transmitted to one terminal of the storage capacitor Cst and the level of the DC power Vdd transferred to the other terminal of the storage capacitor Cst.

For example, when the data signals have different levels according to a Pulse Amplitude Modulation (PAM) method, the level of power stored in the storage capacitor Cst may vary according to a difference in the level of the data signal Vdata.

As another example, when the data signals have different pulse widths according to the Pulse Width Modulation (PWM) method, the level of the power stored in the storage capacitor Cst may vary according to a difference in the pulse width of the data signal Vdata.

The driving switching element SW2 may be turned on according to the level of the power stored in the storage capacitor Cst. When the driving switching element SW2 is turned on, a driving current IOLED, which is proportional to the level of the stored power, flows through the organic light emitting layer OLED. Accordingly, the organic light emitting layer OLED may perform a light emitting operation.

The organic light emitting layer (OLED) includes a light emitting layer (EML) of RGBW corresponding to a subpixel, and may include at least one of a hole injection layer (HIL), a hole transport layer (HTL), an electron transport layer (ETL), and an electron injection layer (EIL) and may further include a hole blocking layer.

On the other hand, the sub pixels may emit white light in the organic light emitting layer (OLED) but, in the case of green, red, blue sub-pixels, a separate color filter is provided for realization of color. That is, in the case of green, red, and blue subpixels, green, red, and blue color filters are further provided, respectively. Meanwhile, since a white sub-pixel emits white light, a separate color filter is unnecessary.

On the other hand, although p-type MOSFETs are illustrated as the scan switching element SW1 and the driving switching element SW2 in the drawing, n-type MOSFETs or other switching elements such as JFETs, IGBTs, or SICs may be used.

FIGS. 7A to 8B are views for explaining a phenomenon in which luminance is darkened as an APL of an image increases due to a PLC curve according to the related art.

A peak luminance control curve may be a curve reflecting an algorithm for lowering power consumption by lowering luminance as an APL increases.

Pixels of the display panel 210 emit light with less than maximum luminance limited by the PLC curve. The PLC curve defines luminance values according to the APL to increase the maximum luminance of pixels to a peak luminance level at a low APL and to lower the maximum luminance of pixels as the APL increases.

The display device 100 may detect the APL in real time, obtain luminance matching the detected APL through a PLC curve, and output an image according to the obtained luminance.

Figure 7A:
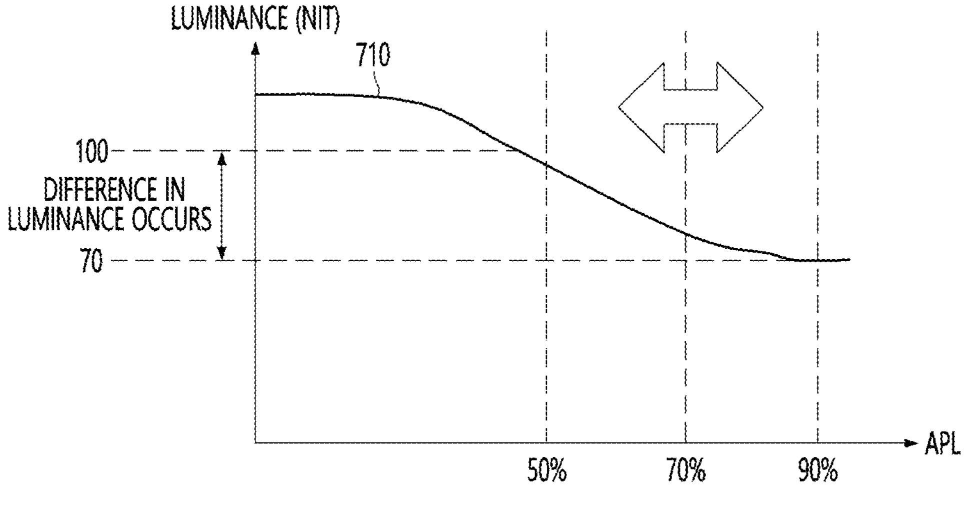
FIGS. 7A to 8B are views for explaining a phenomenon in which luminance is darkened as an APL of an image increases due to a PLC curve according to the related art.
Figure 7B:
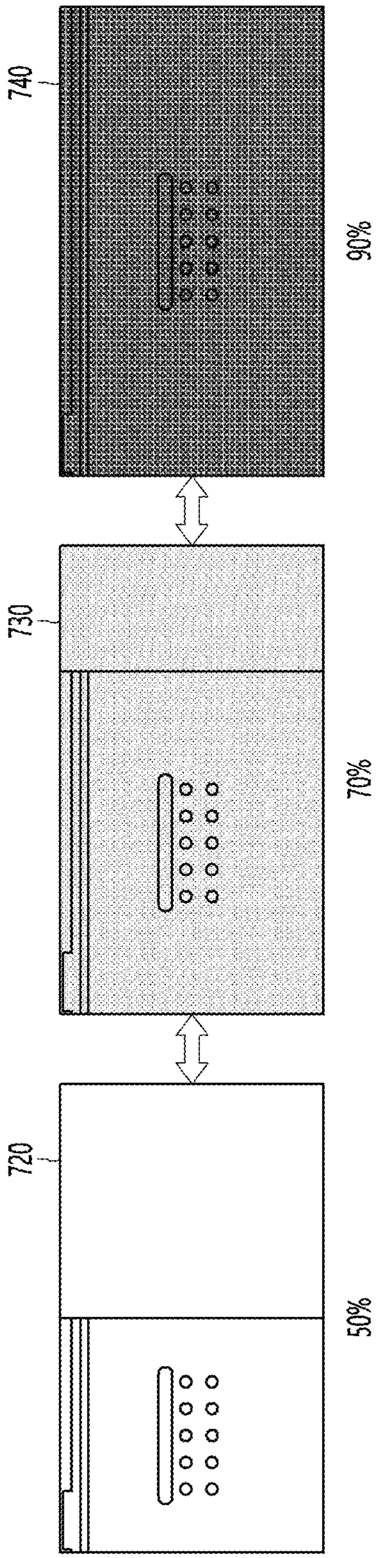
Figure 8A:
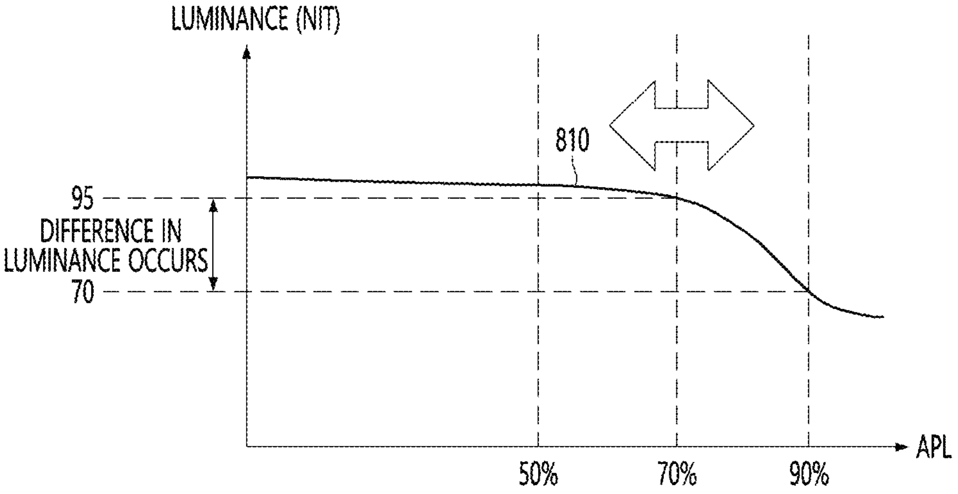
Figure 8B:
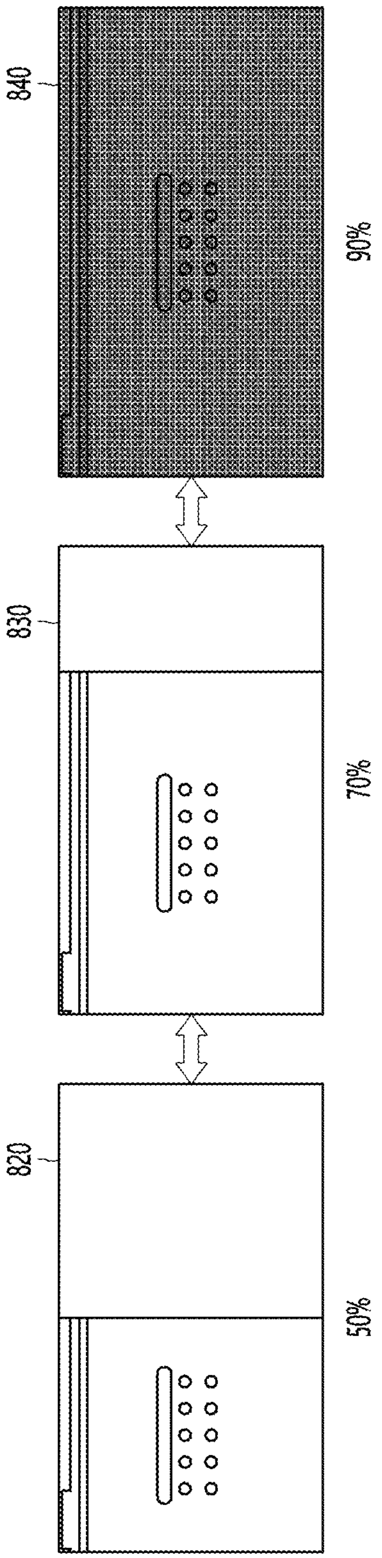

FIGS. 7A and 7B are views showing a change in luminance as an APL increases when using a default PLC curve, and FIGS. 8A and 8B are views showing a change in luminance as the APL increases when using a flat PLC curve.

Any one of the default PLC curve 710 or the flat PLC curve 810 may be applied to the display unit 180.

First, a description will be given referring to FIGS. 7A and 7B.

Referring to FIG. 7A, the default PLC curve 710 is shown. The default PLC curve 710 may be a curve in which luminance decreases as the APL of the image increases.

Referring to FIG. 7B, the APL of the first image 720 is 50%. It is assumed that the APL increased to 70% as a first image 720 is switched to a second image 730 and then the APL increased to 90% as the second image is switched to a third image 740.

That is, the APL increased from 50% to 90% according to image switching.

According to the default PLC curve, a conventional display device rapidly reduced the luminance from 100 nits corresponding to an APL of 50% to 70 nits corresponding to an APL of 90%.

Accordingly, as shown in FIG. 7B, a phenomenon in which the screen darkens due to a rapid decrease in the luminance of the image may cause visual discomfort to a user.

Next, a description will be given referring to FIGS. 8A and 8B.

Referring to FIG. 8A, a flat PLC curve 810 is shown. The flat PLC curve 710 may be a curve in which the luminance gently decreases until the APL reaches a predetermined value, and, when the APL exceeds the predetermined value, the luminance decreases as the APL of the image increases.

Compared to the default PLC curve 710, in the flat PLC curve 810, the luminance may be gently adjusted until the APL reaches the predetermined value.

Here, the predetermined value of the APL may be 70%, but this is only an example.

Referring to FIG. 8B, the APL of the first image 820 is 50%. It is assumed that the APL increases to 70% as a first image 820 is switched to a second image 830, and then the APL increases to 90% as the second image 830 is switched to a third image 840.

That is, the APL increased from 50% to 90% according to image switching.

As the APL increases from 50% to 70%, a difference in luminance does not change significantly, but, when the APL increases from 70% to 90%, the luminance decreases significantly.

That is, according to the flat PLC curve, the conventional display device rapidly decreased the luminance of 95 nits corresponding to the APL of 50% to 70 nits corresponding to the APL of 90% according to the flat PLC curve.

Accordingly, as shown in FIG. 8B, when the second image 830 and the third image 840 are compared, the luminance of the image rapidly decreases and the screen darkens, which may cause visual discomfort to the user.

In an embodiment of the present disclosure, as the APL increases, the output level of the image may be limited to prevent a rapid change in luminance.

Figure 9:
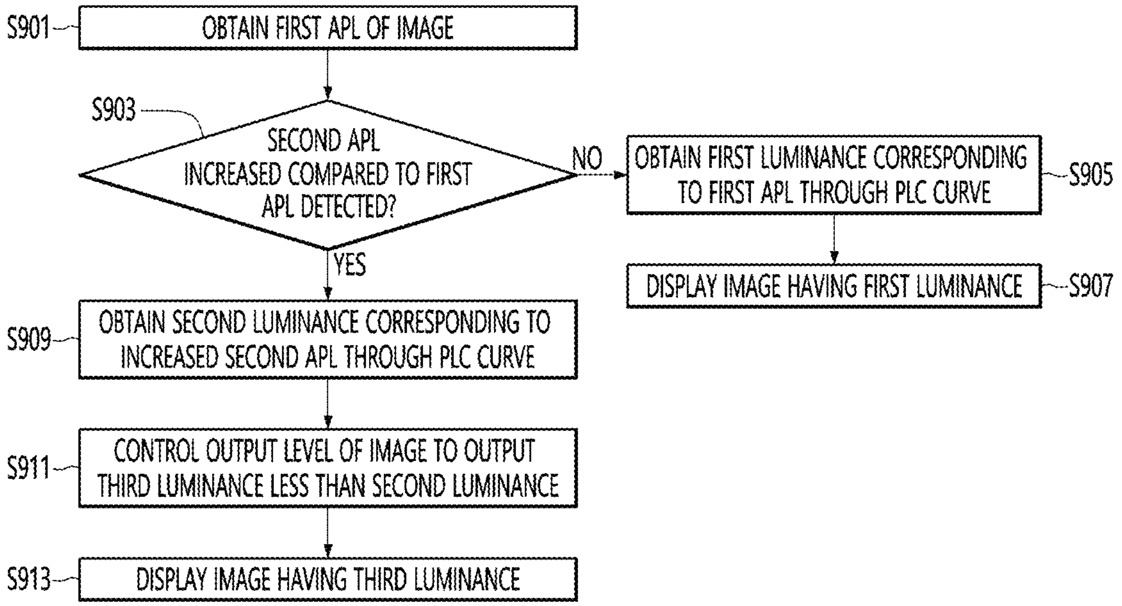
FIG. 9 is a flowchart illustrating a method of operating a display device according to an embodiment of the present disclosure.

FIG. 9 is a flowchart illustrating a method of operating a display device according to an embodiment of the present disclosure.

Hereinafter, the control unit 170 may include all components except for the memory 240 and the display panel 210 in FIG. 5.

In addition, it is assumed that any one of the default PLC curve 710 and the flat PLC curve 810 is applied to the display device 100 in the embodiment of the present disclosure.

APL values representing the PLC curve and luminance corresponding to the APL values may be stored in the storage unit 140 in the form of a table.

The control unit 170 of the display device 100 obtains a first APL of an image (S901).

The control unit 170 may obtain an average of the brightness of each of a plurality of pixels constituting the display panel 210 through the APL.

The control unit 170 may calculate the APL based on RGB data or YUV data applied to the display panel 210.

The control unit 170 determines whether an increased second APL compared to the first APL is detected (S903).

The control unit 170 may detect a change in APL value based on RGB data or YUV data. In particular, the control unit 170 may determine whether the APL value has increased.

In another embodiment, the control unit 170 may detect whether the APL value has increased by a predetermined value or a predetermined percentage.

When the APL of the image is not increased compared to the first APL, the control unit 170 obtains first luminance corresponding to the first APL through a Peak Luminance Control (PLC) curve (S905).

In an embodiment, when the APL of the image is not changed, the control unit 170 may extract the first luminance corresponding to the first APL through the PLC curve.

In another embodiment, when the APL of the image decreases, the control unit 170 may extract luminance corresponding to the decreased APL than the first APL through the PLC curve, and may output an image having the extracted luminance.

The control unit 170 displays the obtained image having the first luminance through the display panel 210 (S907).

The control unit 170 may supply current matching the first luminance to a plurality of pixels included in the display panel 210 to output the image having the first luminance.

Meanwhile, the control unit 170 obtains second luminance corresponding to the second APL through the PLC curve when the second APL increased compared to the first APL is detected (S909).

When detecting an increase in APL according to image switching, the control unit 170 may extract second luminance corresponding to the increased APL.

The control unit 170 controls the output level of the image to output third luminance greater than the obtained second luminance (S911).

The control unit 170 may control the output level of the image to prevent a rapid decrease in luminance according to an increase in APL.

Controlling the output level of the image may mean reducing the APL value of the image to prevent a rapid decrease in luminance.

In an embodiment, the control unit 170 may control the output level of the image by adjusting the contrast of the image. The control unit 170 may limit the output level of the image by reducing the contrast of the image by a predetermined percentage.

In another embodiment, the control unit 170 may control the output level of the image by adjusting the brightness of the image. The control unit 170 may limit the output level of the image by reducing the brightness of the image by a predetermined value.

In another embodiment, the control unit 170 may control the output level of the image by adjusting the contrast and brightness of the image.

That is, the control unit 170 may perform image quality processing on an image signal and transmit image data on which image quality processing has been performed to the timing controller 232.

In an embodiment, the control unit 170 may control the output level of the image to obtain the third luminance increased by the predetermined percentage from the second luminance.

The control unit 170 displays an image having the third luminance through the panel 210 (S913).

The timing controller 232 may generate a timing control signal for controlling operation timings of the data driving unit 236 and the gate driving unit 234 based on a timing signal received together with image data on which image quality processing has been performed.

The timing signal input to the timing controller 232 may include a vertical synchronization signal, a horizontal synchronization signal, a main clock signal, a data enable signal, and the like.

The data driving unit 236 and the gate driving unit 234 may generate a data driving signal and a gate driving signal according to the timing control signal, respectively, and transmit the generated signals to the panel 210.

The panel 210 may output an image having the third luminance by supplying current to each pixel according to the received data driving signal and gate driving signal.

FIGS. 10 to 13 are views illustrating a process of controlling an output level of an image according to various embodiments of the present disclosure.

FIGS. 10 to 13 are exemplary embodiments of step S911 of FIG. 9.

Figure 10:
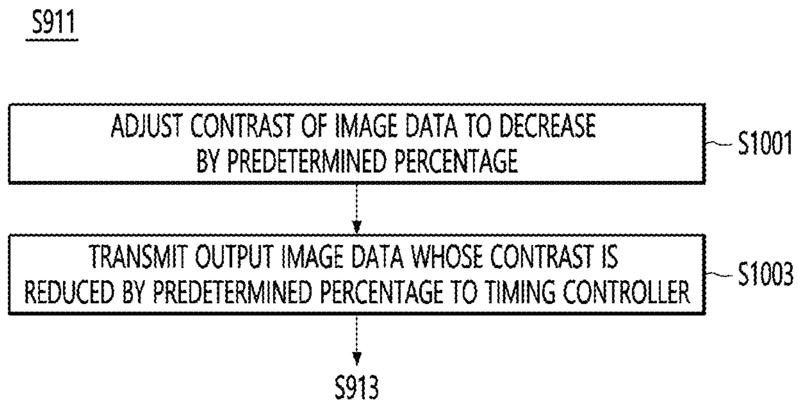
FIGS. 10 to 13 are views illustrating a process of controlling an output level of an image according to various embodiments of the present disclosure.

First, a description will be given referring to FIG. 10. FIG. 10 is a view for explaining a process of controlling the output level of an image by reducing contrast by a predetermined percentage.

Referring to FIG. 8, the processor 270 included in the control unit 170 adjusts the contrast of the input image data to be reduced by a predetermined percentage (S1001).

The processor 270 may control the output level of the image by reducing the contrast of RGB data by a predetermined percentage, in order to reduce the decrease in luminance.

The processor 270 may control the output level of the image by using an alpha blending method for RGB data. This will be described later.

The predetermined percentage may coincide with the reduction percentage of the APL. For example, the predetermined percentage may be 0.8, but this is only an example.

For example, the processor 270 may reduce the contrast of the RGB data by the predetermined percentage as shown in Equation 1 below.

$$Ro = Ri \times \text{cont\_adj}$$
$$Go = Gi \times \text{cont\_adj}$$
$$Bo = Bi \times \text{cont\_adj} \quad \text{[Equation 1]}$$

where, Ri/Gi/Bi is input image data, and cont_adj is a preset percentage and may have a value between 0 and 1. Ro/Go/Bo may be output image data.

The processor 270 transmits the output image data whose contrast is reduced by the predetermined percentage to the timing controller 232 (S1003).

Figure 11:
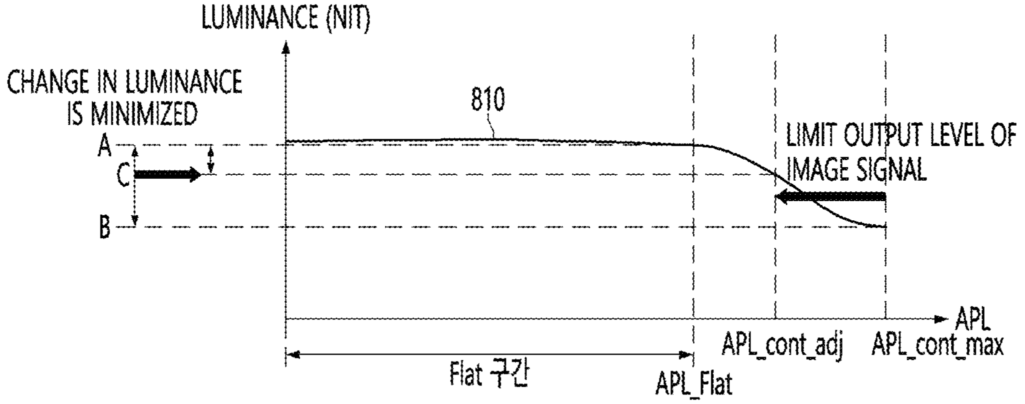

FIG. 11 is a view for explaining an example of limiting an output level of an image by reducing contrast by a predetermined percentage according to an increase in APL when a flat PLC curve is used according to an embodiment of the present disclosure.

Referring to FIG. 11, a flat PLC curve 810 is shown.

In the flat PLC curve 810, the luminance corresponding to an APL of 0 to a specific value APL_Flat is fixed or hardly changed.

If the APL of the image is changed from the specific value APL_Flat to a maximum value APL_cont_max, the processor 270 may reduce the contrast by a predetermined percentage to limit the output level of the image signal, in order to prevent a rapid decrease in luminance.

The processor 270 may reduce the contrast of the image signal by the predetermined percentage so that the APL value has the adjusted value APL_cont_adj at the maximum value APL_cont_max.

As the contrast is reduced by the predetermined percentage, the change in luminance is reduced from A to C, not from A to B, so that the change in luminance can be minimized.

That is, as the APL rapidly increases, the luminance is prevented from rapidly decreasing, so that the user cannot perceive the change in luminance with the naked eye.

According to an embodiment, the predetermined percentage at which the contrast is reduced may be preset. For example, the predetermined percentage may be 0.8, but is not limited thereto.

Also, in an embodiment of the present disclosure, the condition for reducing the output level of the image signal may be limited to a case in which the APL increases by a preset value or increases by a preset percentage.

That is, the processor 270 may decrease the contrast of the image signal by the predetermined percentage only when the APL increases by a preset value or increases by a preset percentage.

Although, in FIG. 11, it has been described that the embodiment of the present disclosure is applied only to the flat PLC curve 810, it is not necessary to be limited thereto. The embodiment of the present disclosure is applied to the default PLC curve 810 to reduce the output level of the image signal in order to minimize the change in luminance as the APL increases.

Next, a description will be given referring to FIG. 12.

Figure 12:
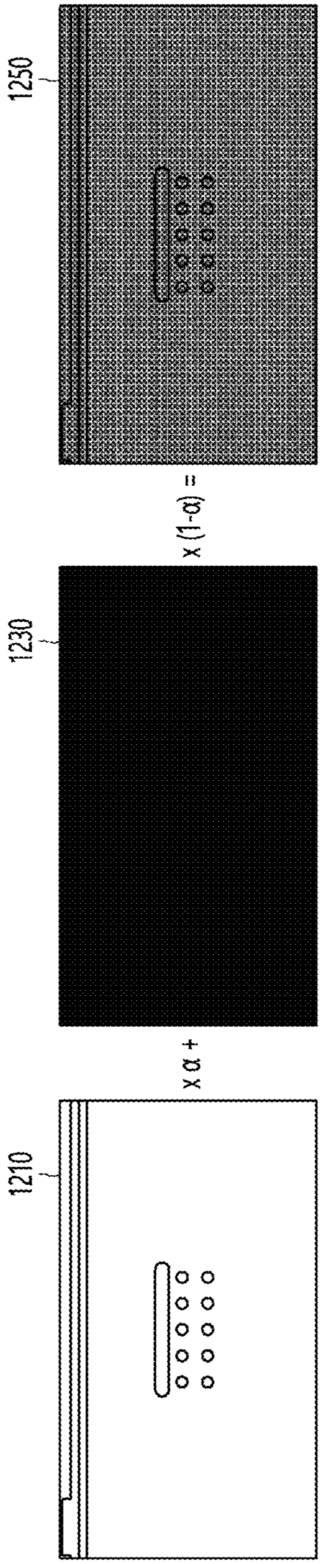

FIG. 12 is a view for explaining an example of adjusting the contrast of an image through an alpha blending method according to an embodiment of the present disclosure.

The alpha blending method may be a method of providing a transparent reflection effect by superimposing another image 1230 on an image 1210. Another image 1230 may be a black image.

The alpha blending method may be a method of obtaining the output image 1250 by allocating a specific percentage a to the image 1210 and allocating a percentage 1-*a* to the black image 1230.

Image data output according to the alpha blending method may be expressed as [Equation 2] below.

$$Ro = Ri \times \alpha + \text{Black } R \times (1-\alpha) \quad \text{[Equation 2]}$$

$$Go = Gi \times \alpha + \text{Black } G \times (1-\alpha)$$

$$Bo = Bi \times \alpha + \text{Black } B \times (1-\alpha)$$

where, Ri/Gi/Bi is input image data, and a is a preset percentage and may have a value between 0 and 1. Black R/Black G/Black B may be RGB values for a black image, and Ro/Go/Bo may be output image data.

α may have a value equal to a predetermined percentage used to reduce the contrast.

That is, the processor 270 may reduce the contrast of the image by a predetermined percentage by using the alpha blending method.

Next, a description will be given referring to FIG. 13.

Figure 13:
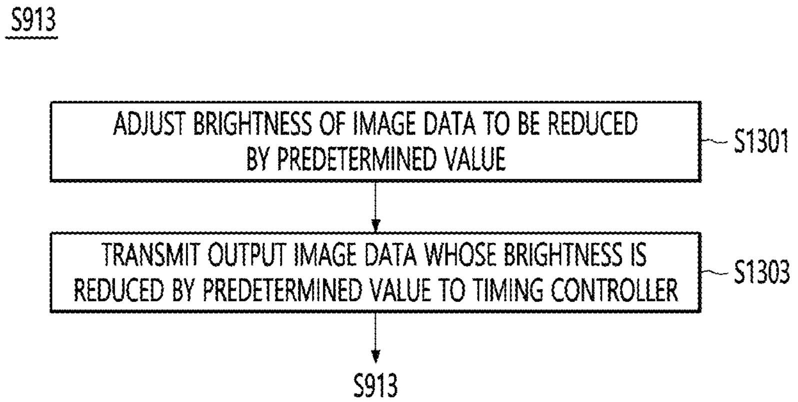

FIG. 13 is a view for explaining a process of controlling an output level of an image by decreasing the brightness by a predetermined value.

Referring to FIG. 13, the processor 270 included in the control unit 170 adjusts the brightness of the input image data to be reduced by a predetermined value (S1301).

The processor 270 may control the output level of the image by reducing the brightness of the RGB data by a predetermined value. The predetermined value may be expressed as an offset value.

For example, the processor 270 may decrease the brightness of the RGB data by a predetermined value as shown in Equation 2 below.

$$Ro = Ri - H \quad \text{[Equation 2]}$$

$$Go = Gi - H$$

$$Bo = Bi - H$$

where, Ri/Gi/Bi may be input image data, H may be a preset value, and Ro/Go/Bo may be output image data.

The processor 270 transmits the output image data whose brightness is reduced by a predetermined value to the timing controller 232 (S1303).

Next, a description will be given referring to FIG. 14.

Figure 14:
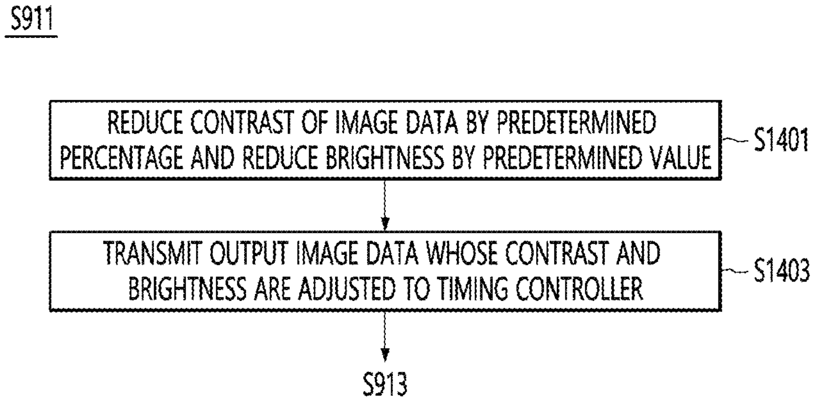
FIG. 14 is a view illustrating a process of controlling an output level of an image by reducing contrast by a predetermined percentage and reducing brightness by a predetermined value.

FIG. 14 is a view illustrating a process of controlling an output level of an image by reducing contrast by a predetermined percentage and reducing brightness by a predetermined value.

Referring to FIG. 14, the processor 270 included in the control unit 170 reduces the contrast of the input image data by a predetermined percentage and reduces the brightness by a predetermined value (S1401).

For example, the processor 270 may adjust the contrast and brightness of RGB data as in Equation 3 below.

$$Ro = Ri \times \text{cont\_adj} - H \quad \text{[Equation 3]}$$

$$Go = Gi \times \text{cont\_adj} - H$$

$$Bo = Bi \times \text{cont\_adj} - H$$

where, Ri/Gi/Bi is input image data, and cont_adj is a preset percentage and may have a value between 0 and 1. H may be a preset value, and Ro/Go/Bo may be output image data.

The processor 270 transmits the output image data whose contrast and brightness are adjusted to the timing controller 232 (S1403).

According to an embodiment of the present disclosure, the output level of the image may be controlled by adjusting one or more of the contrast or the brightness of the image.

Figure 15:
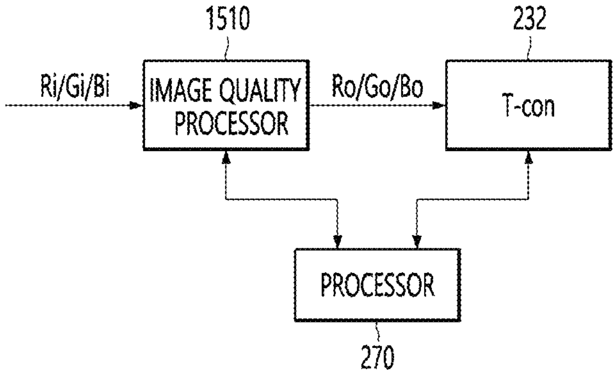
FIG. 15 is a block diagram illustrating a process of controlling an output level of an image according to an embodiment of the present disclosure.

FIG. 15 is a block diagram illustrating a process of controlling an output level of an image according to an embodiment of the present disclosure.

The processor 270 and an image quality processor 232 of FIG. 15 may be included in the control unit 170.

The image quality processor 1510 may perform image quality processing such that the APL is reduced on the input RGB data Ri/Gi/Bi, and transmit the output RGB data Ro/Go/Bo which is a result of performing image quality processing to the timing controller (T-con) 232.

The processor 270 may control the image quality processor 1510 to reduce the contrast of the RGB data Ri/Gi/Bi by a predetermined percentage.

The processor 270 may control the image quality processor 1510 to reduce the brightness of the RGB data Ri/Gi/Bi by a predetermined value.

The processor 270 may control the image quality processor 1510 to reduce the contrast of the RGB data Ri/Gi/Bi by a predetermined percentage and to reduce the brightness by a predetermined value.

Figure 16:
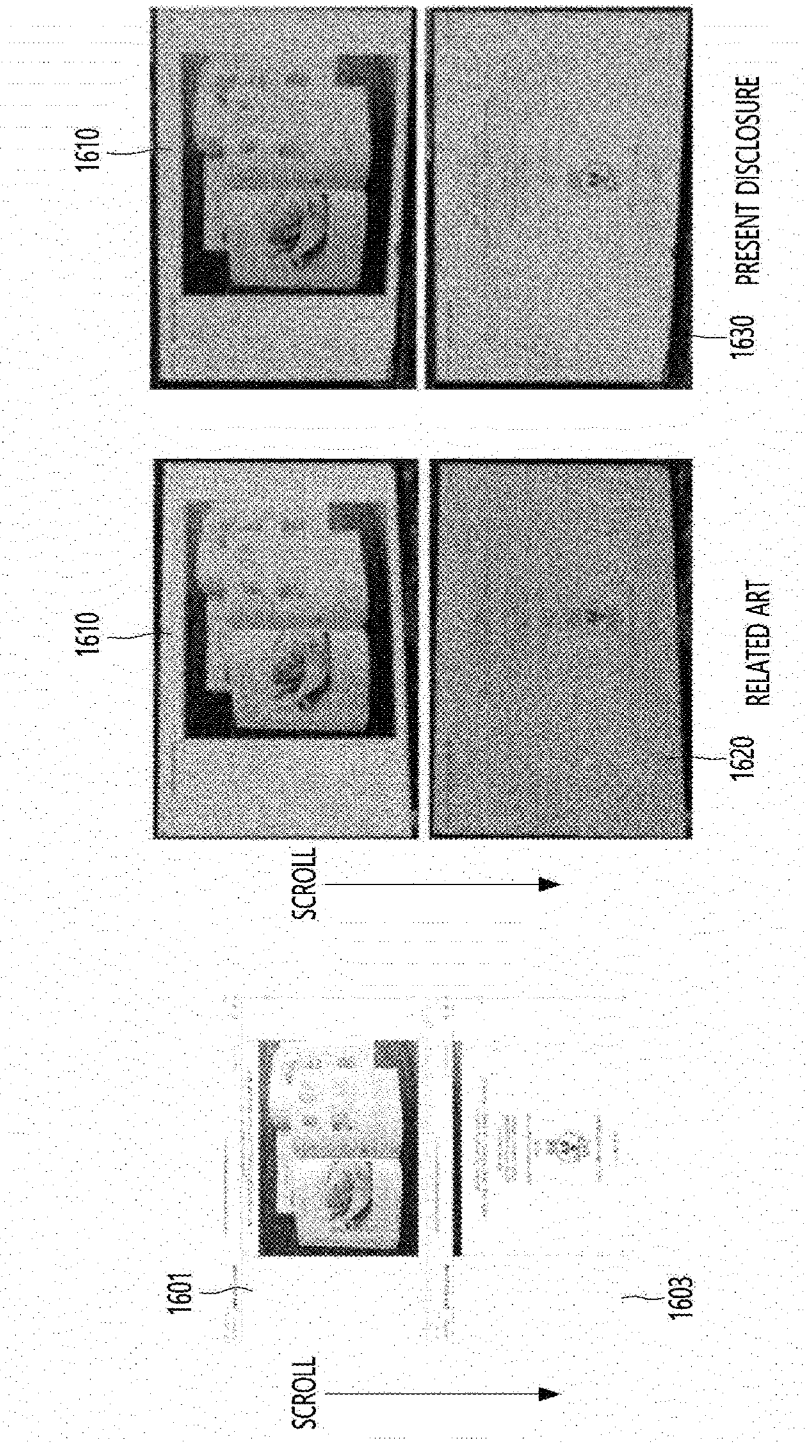
FIG. 16 is a diagram for comparing examples to which the related art and an embodiment of the present disclosure are applied, when scrolling from an image with a low APL to an image with a high APL on a web browser screen.

FIG. 16 is a diagram for comparing examples to which the related art and an embodiment of the present disclosure are applied, when scrolling from an image with a low APL to an image with a high APL on a web browser screen.

In FIG. 16, it is assumed that the display device uses the flat PLC curve 810.

Also, it is assumed that the APL of the first image 1601 displayed on the web browser screen is 70, and the APL of the second image 1603 switched according to scrolling is 90.

According to the related art, a first image 1601 may be converted into a corrected image 1610 with reduced luminance according to the flat PLC curve. Also, when the first image 1601 is converted into a second image 1603 according to scrolling, the second image 1630 may be output as an image 1620 with significantly reduced luminance according to the flat PLC curve.

That is, according to the related art, when an image with a low APL is converted into an image with a high APL according to scrolling, the screen is rapidly darkened due to the influence of the PLC curve. The user may feel sudden darkening of the screen with the naked eye.

On the other hand, according to an embodiment of the present disclosure, when the first image 1601 is converted into the second image 1603 according to scrolling, the APL value is adjusted even if the flat PLC curve is used, so the image 1630 in which the change in luminance is alleviated may be output.

Accordingly, it is difficult for the user to recognize the change in brightness of the screen with the naked eye, so that the user may not feel inconvenience in viewing the image.

Meanwhile, an embodiment of the present disclosure may be applied not only to a web browser screen but also to a screen of a TV. For example, when a web page is being displayed on the TV, even if it is scrolled from a web page with a low APL to a web page with a high APL through the remote control device 200, a rapid change in luminance can be prevented according to the control of the output level of the image.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device described above is not limited to the configuration and method of the above-described embodiments, and the above embodiments may be configured by selectively combining all or some of embodiments such that various modifications may be made.

What is claimed is:

1. A display device for controlling luminance of an image through a peak luminance control (PLC) curve, the display device comprising:

a display; and a controller configured to:

obtain a first average picture level (APL) of a first image, determine whether a second APL of a second image is greater than the first APL based on the first image being switched to the second image, and control an image quality of the second image to reduce an output level of the second image below the output level based on the second APL according to the peak luminance control curve, when the second APL is determined to be greater than the first APL.

2. The display device of claim 1, wherein the controller is configured to reduce the output level of the second image by a predetermined amount.

3. The display device of claim 1, wherein the controller is configured to reduce the output level of the second image by reducing a contrast of the second image by a predetermined percentage.

4. The display device of claim 1, wherein the controller is configured to reduce the output level of the second image by reducing a brightness of the second image by a predetermined value.

5. The display device of claim 1, wherein the controller is configured to reduce the output level of the second image by reducing a contrast of the second image by a predetermined percentage and by reducing a brightness of the second image, whose contrast is reduced by the predetermined percentage, by a predetermined value.

6. The display device of claim 1, wherein the controller is configured to reduce the output level of the second image when the second APL is greater than the first APL by a preset value or a preset percentage.

7. The display device of claim 1, wherein the PLC curve is any one of:

a default PLC curve in which a luminance is reduced as the APL of a corresponding image increases, or a flat PLC curve in which:

a luminance is reduced until the APL increases to a predetermined value, and the luminance is no longer increased when the APL reaches or exceeds the predetermined value.

8. The display device of claim 1, wherein the controller transmits an output image data in which an image quality of the second image is controlled by a timing controller provided in the display, and wherein the timing controller outputs the output image data to a display panel provided in the display based on a timing signal of the timing controller.

9. A method of operating a display device for controlling luminance of an image through a peak luminance control (PLC) curve, the method comprising:

obtaining a first average picture level (APL) of a first image;

determining whether a second APL of a second image is greater than the first APL based on the first image being switched to the second image; and controlling an image quality of the second image to reduce an output level of the second image below the output level based on the second APL according to the peak luminance control curve, when the second APL is determined to be greater than the first APL.

10. The method of claim 9, wherein the controlling the image quality of the second image comprises reducing the output level of the second image by a predetermined amount.

11. The method of claim 9, wherein the controlling the image quality of the second image comprises reducing the output level of the second image by reducing a contrast of the second image by a predetermined percentage.

12. The method of claim 9, wherein the controlling the image quality of the second image comprises reducing the output level of the second image by reducing a brightness of the second image by a predetermined value.

13. The method of claim 9, wherein the controlling the image quality of the second image comprises:

reducing the output level of the second image by:

reducing a contrast of the second image by a predetermined percentage; and reducing a brightness of the second image, whose contrast is reduced by the predetermined percentage, by a predetermined value.

14. The method of claim 9, wherein the controlling the image quality of the second image comprises reducing the output level of the second image when the second APL is greater than the first APL by a preset value or a preset percentage.

15. The method of claim 9, wherein the PLC curve is any one of:

a default PLC curve in which a luminance decreases as the APL of a corresponding image increases, or a flat PLC curve in which:

a luminance is reduced until the APL increases to a predetermined value, and the luminance is no longer increased when the APL reaches or exceeds the predetermined value.

* * * * *